Patented Dec. 23, 1952

2,623,068

UNITED STATES PATENT OFFICE 2,623,068

OXIDATION OF ISOBUTYRALDOXAN

Leslie Ernest Cooper and Richard Norman Lacey, Hull, England, assignors to British Industrial Solvents Limited, London, England, a British company No Drawing. Application January 10, 1951, Serial No. 205,433. In Great Britain January 19, 1950

8 Claims. (Cl. 260—535)

1

This invention relates to the production of 2:2:4-trimethyl-3-ol-1-pentanoic acid by the oxidation of 5:5-dimethyl-2:4-di-isopropyl-6-hydroxy-1:3-dioxan, otherwise known as isobutyraldoxan.

The production of the above-mentioned hydroxy octanoic acid by the oxidation of the corresponding diol with aqueous potassium permanganate has already been described in Monatschefte, 19, at page 357, and a similar process employing isobutyraldol as the starting material was suggested in the same journal, volume 17, at page 646 and volume 22 at page 1112.

The principal object of the invention is to provide a simple, efficient process for the oxidation of isobutyraldoxan to produce 2:2:4-trimethyl-3-ol-1 pentanoic acid.

The invention accordingly comprises the novel processes and steps of processes, specific embodiments of which are described hereinafter by way of example and in accordance with which I now prefer to practice the invention.

According to the present invention the process for the production of 2:2:4-trimethyl-3-ol-1-pentanoic acid comprises the oxidation of 5:5-dimethyl-2:4-di-isopropyl -6- hydroxy-1:3-dioxan, in the liquid phase under slightly acidic conditions by intimate contact with a gas containing molecular oxygen, such as air or, preferably, oxygen itself in the presence of an oxidation catalyst.

It is preferred to conduct the oxidation in the presence of a diluent, which may be either a neutral solvent such as isobutanol, other alcohols, ketones, or a weak organic acid such as acetic, propionic, butyric or isobutyric acid, but this is not to be construed as a limiting feature. When a neutral solvent is employed as diluent, or when no diluent is employed at all, it is necessary to add some acid to produce the said acid conditions, although in many cases, when crude undistilled isobutyraldoxan which has been dried, for example, over calcium chloride, is employed in the process, it may be found sufficiently acidic to allow the oxidation to proceed at a sufficiently high initial rate without further addition of acid. It should be noted that as the reaction proceeds the carboxylic acids produced increase the acidity and allow the reaction to proceed at full rate.

As the reaction is usually carried out in a non-aqueous medium it is not possible to give a pH limit for the acid conditions, but it is to be understood that only slightly acid conditions are necessary and that they may be brought about by the addition of an acid in those cases where the starting material is not itself sufficiently acidic.

2

The temperature should not be allowed to exceed 60° C. during the oxidation, since higher temperatures lead to more extensive break-down and burning, and the preferred temperature limits are 30°–45° C. Lower temperatures may be used, for example as low as 20° C., but the rate of oxidation is then comparatively slow.

The oxygen carrier catalysts which have been found to be satisfactory in use are vanadium pentoxide, canadic acid, and compounds of cobalt, copper, uranium and tungsten; manganous acetate, which is a commonly used oxygen carrier type of catalyst for similar oxidations utilising molecular oxygen, is, by itself, not so suitable for the oxidation of isobutyraldoxan. Manganous acetate, in conjunction, or combination, with one or more of the other catalysts which are able to promite the oxidation, for example, cobalt acetate, or copper acetate, is, however, a very satisfactory catalyst for the process of this invention, as it prevents the formation of coloured products. Manganic acetate is a satisfactory catalyst for the oxidation, either by itself or in conjunction, or combination, with other catalysts mentioned above and since the state of oxidation of manganese compounds is influenced by the prevailing oxygen concentration, these compounds are preferably employed when high oxygen concentrations are available so as to maintain the catalyst as far as possible in the manganic state.

The pressure of the oxygen-containing gas in the oxidation chamber is not a critical feature of the process of the invention and, accordingly, atmospheric or super atmospheric pressures may be employed.

The reaction products may be recovered from the oxidation mixture by steam distillation or straight distillation; in the latter case it being necessary first to remove the catalyst, since otherwise break-down and ketonisation of the products takes place. A preferred procedure consists in steam distillation to remove lower boiling products, chiefly isobutyric acid, followed by extraction of the aqueous residue with a solvent for the hydroxy acid and purification of the latter by vacuum distillation or crystallisation.

The following examples illustrate various embodiments of this invention, the parts referred to being by weight:

Example 1

A mixture of 293 parts of crude isobutyraldoxan, obtained by alkali-catalysed condensation of isobutyraldehyde, followed by drying over sodium sulphate and evaporation to remove solvents and unchanged aldehyde, 0.42 part of cobalt acetate, 0.10 part of copper acetate, 0.02 part of manganous acetate and 10 parts of acetic acid was oxidised at 43–49° C. by passing oxygen through the stirred liquor. The product was dissolved in diethyl ether and the catalysts removed by water washing. After distillation of the ether the residue was steam distilled to remove isobutyric acid and other steam-volatile products, and the hydroxy acid in the aqueous residue was extracted by ether, giving 144 parts of the crude material, melting at 70–82° C. After recrystallisation from petroleum ether, the pure hydroxy acid was found to melt at 93–94.5° C.

*Example 2*

A mixture of 270 parts of crude isobutyraldoxan which had been dried over calcium chloride, 0.42 part of cobalt acetate, 0.1 part of copper acetate, 0.02 part of manganous acetate and 120 parts of isobutanol was oxidised as set forth in Example 1 to give, on working up, 111 parts of the crude hydroxy acid.

*Example 3*

A mixture of 1060 parts of isobutyraldoxan, 1.48 parts of cobalt acetate, 0.40 part of copper acetate, 0.08 part of manganese acetate and 10 parts of acetic acid was oxidised as set forth in Example 1, but at 32°–47° C. for a period of 79 hours. The product was isolated as set forth in Example 1 except that the catalyst removal step was omitted, to give 396 parts of the crude hydroxy acid.

An important advantage of this invention is that it affords a convenient method for the production of the hydroxy acid which one would normally expect to obtain by the oxidation of isobutyraldol, the latter material being expensive and not readily available.

We claim:

1. A process for the production of 2:2:4-trimethyl-3-ol-1-pentanoic acid which comprises oxidising 5:5-dimethyl-2:4-di-isopropyl-6-hydroxy-1:3-dioxan in the liquid phase under slightly acidic conditions by intimate contact with a gas containing molecular oxygen in the presence of an oxidation catalyst.

2. A process as claimed in claim 1, wherein the oxygen-containing gas is substantially pure oxygen.

3. A process as claimed in claim 1, wherein the slightly acidic 5:5-dimethyl-2:4-di-isopropyl-6-hydroxy-1:3-dioxan is obtained by drying crude 5:5-dimethyl-2:4-di-isopropyl-6-hydroxy-1:3-dioxan over calcium chloride.

4. A process as claimed in claim 1, wherein the oxidation catalyst is selected from the group consisting of compounds of vanadium, cobalt, copper and manganese and mixtures thereof.

5. A process as claimed in claim 1, wherein the oxidation is conducted in the presence of a neutral diluent selected from the group consisting of an alcohol and a ketone.

6. A process as claimed in claim 1, wherein the oxidation is conducted in the presence of an acidic diluent selected from the group consisting of acetic acid, propionic acid, butyric acid and isobutyric acid.

7. A process as claimed in claim 1, wherein the temperature of the reaction mixture is about 20° to about 60° C.

8. A process as claimed in claim 1, wherein the isobutyric acid formed in the oxidation is recovered by steam distillation and the 2:2:4-trimethyl-3-ol-1-pentanoic acid is recovered from the aqueous residue from the steam distillation by a solvent extraction procedure.

LESLIE ERNEST COOPER.
RICHARD NORMAN LACEY.

REFERENCES CITED

The following references are of record in the file of this patent:

UNITED STATES PATENTS

| Number | Name | Date |
|---|---|---|
| 2,453,890 | Bremner et al. | Nov. 16, 1948 |

OTHER REFERENCES

Franke et al.: Beilstein (Handbuch, 4th ed.), vol. 3, p. 353 (1921).